(12) United States Patent
Waltermann et al.

(10) Patent No.: US 11,803,496 B2
(45) Date of Patent: Oct. 31, 2023

(54) SYSTEMS, APPARATUS, AND METHODS FOR ELECTING A NEW BROKER FOR A CHANNEL ON AN MQTT BUS

(71) Applicant: Lenovo (Singapore) Pte. Ltd., New Tech Park (SG)

(72) Inventors: Rod D. Waltermann, Rougemont, NC (US); Alfredo Zugasti, Cary, NC (US); Ratan Ray, Cary, NC (US); Rodrigo Almeida, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 175 days.

(21) Appl. No.: 17/515,197

(22) Filed: Oct. 29, 2021

(65) Prior Publication Data
US 2023/0133192 A1 May 4, 2023

(51) Int. Cl.
*G06F 13/378* (2006.01)
*H04L 43/10* (2022.01)
*G06F 9/4401* (2018.01)

(52) U.S. Cl.
CPC .......... *G06F 13/378* (2013.01); *G06F 9/4406* (2013.01); *H04L 43/10* (2013.01)

(58) Field of Classification Search
CPC ....... G06F 13/378; G06F 9/4406; H04L 43/10
See application file for complete search history.

(56) References Cited

U.S. PATENT DOCUMENTS

| 10,565,227 B1 * | 2/2020 | Chen | G06F 16/27 |
|---|---|---|---|
| 2008/0137528 A1 * | 6/2008 | O'Toole | H04L 43/0817 |
| | | | 370/216 |
| 2016/0156502 A1 * | 6/2016 | Fugitt | H04L 12/1895 |
| | | | 709/205 |
| 2017/0339005 A1 * | 11/2017 | Yuan | H04L 41/0668 |
| 2018/0183656 A1 * | 6/2018 | Jones | H04W 24/04 |
| 2020/0195501 A1 * | 6/2020 | Shenoy | H04L 41/0816 |
| 2020/0366631 A1 * | 11/2020 | Hoffner | G06F 9/546 |
| 2022/0159769 A1 * | 5/2022 | Zhang | H04W 88/04 |

OTHER PUBLICATIONS

T. Faika, T. Kim and M. Khan, "An Internet of Things (IoT)-Based Network for Dispersed and Decentralized Wireless Battery Management Systems," 2018 IEEE Transportation Electrification Conference and Expo (ITEC), Long Beach, CA, USA, 2018, pp. 1060-1064 (Year: 2018).*
OASIS Standard, "MQTT Version 5.0", 2019 (Year: 2019).*

* cited by examiner

*Primary Examiner* — Phong H Dang
(74) *Attorney, Agent, or Firm* — Kunzler Bean & Adamson

(57) ABSTRACT

Systems, apparatus, and methods that can elect a broker on a Message Queuing Telemetry Transport (MQTT) bus are disclosed. One system includes an MQTT bus and a set of client devices on the MQTT bus. Each client device maintains a set of attributes for each other client device and casts one or more votes for a particular client device on the MQTT bus to elect the particular client device as a new broker on the MQTT bus in response to a current broker on the MQTT bus becoming unavailable. The votes cast for the particular client device are based on a first value corresponding to one or more attributes for the particular client device relative to respective second values to the corresponding attribute(s) for each of the other client devices on the MQTT bus as calculated by each respective client device on the MQTT bus.

20 Claims, 14 Drawing Sheets

SYSTEMS, APPARATUS, AND METHODS FOR ELECTING A NEW BROKER FOR A CHANNEL ON AN MQTT BUS

FIELD

The subject matter disclosed herein relates to electronic systems and more particularly relates to systems, apparatus, and methods that can elect a new broker for a channel on a Message Queuing Telemetry Transport (MQTT) bus.

DESCRIPTION OF THE RELATED ART

For a Message Queuing Telemetry Transport (MQTT) bus to be operable, the broker of a channel on the MQTT bus must be alive and active and be in communication with the other clients on the channel on the MQTT bus. If the broker goes offline or otherwise becomes unavailable, the channel on the MQTT bus and/or the MQTT bus becomes at least temporarily inoperable. Conventional channels on an MQTT buses and/or conventional MQTT buses do not have a process to heal from a broker of a channel on an MQTT bus becoming inoperable due to the broker failing, going offline, or otherwise becoming unavailable.

BRIEF SUMMARY

Systems and apparatus that can elect a new broker of a channel on a Message Queuing Telemetry Transport (MQTT) bus are disclosed. One system includes an MQTT bus and a plurality of client devices in communication with each other on the MQTT bus. In various embodiments, each client device in the plurality of client devices is configured to maintain a set of attributes for each other client device in the plurality of client devices on the MQTT bus and cast a set of votes for a particular client device in the plurality of client devices on the MQTT bus to elect the particular client device as a new broker on the MQTT bus in response to a current broker on the MQTT bus becoming unavailable. In some embodiments, the set of votes cast for the particular client device are based on a first value corresponding to the set of attributes for the particular client device relative to a respective second value corresponding to the set of attributes for each of the other client devices in the plurality of client devices on the MQTT bus as calculated by each respective client device in the plurality of client devices on the MQTT bus.

An apparatus for electing a broker on an MQTT includes a processor coupleable to an MQTT bus and a memory that stores code executable by the processor. The executable code causes the processor to maintain a set of attributes for each client device in a plurality of client devices on the MQTT bus and cast a set of votes for a particular client device in the plurality of client devices on the MQTT bus to elect the particular client device as a new broker on the MQTT bus in response to a current broker on the MQTT bus becoming unavailable. In some embodiments, the set of votes cast for the particular client device are based on a first value corresponding to the set of attributes for the particular client device relative to a respective second value corresponding to the set of attributes for each of the other client devices in the plurality of client devices on the MQTT bus and the apparatus is one of the plurality of client devices on the MQTT bus.

Methods for electing a broker on an MQTT bus are also disclosed. On method includes maintaining, by a processor, a set of attributes for each client device in a plurality of client devices on an MQTT bus and casting a set of votes for a particular client device in the plurality of client devices on the MQTT bus to elect the particular client device as a new broker on the MQTT bus in response to a current broker on the MQTT bus becoming unavailable. In some embodiments, the set of votes cast for the particular client device are based on a first value corresponding to the set of attributes for the particular client device relative to a respective second value corresponding to the set of attributes for each of the other client devices in the plurality of client devices on the MQTT bus and the processor is included on one of the plurality of client devices on the MQTT bus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
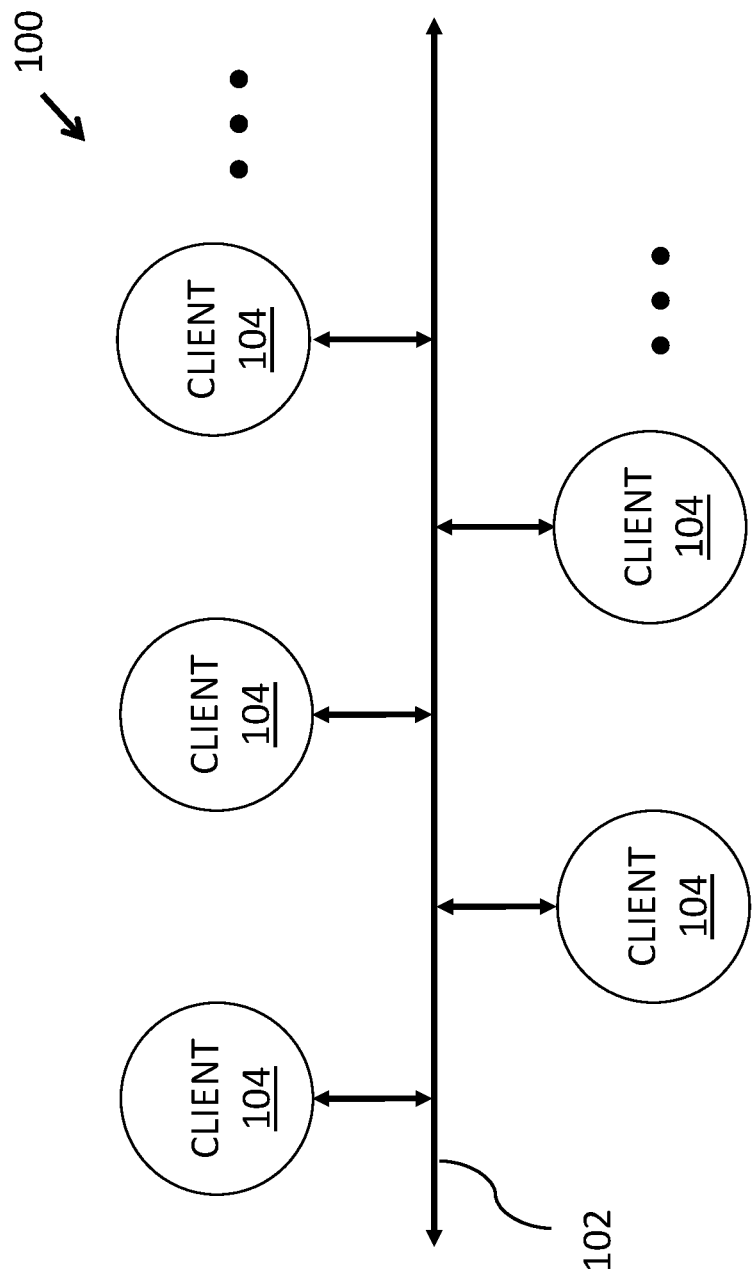
FIG. 1 is a schematic block diagram of one embodiment of a Message Queuing Telemetry Transport (MQTT) system that can elect a new broker for a channel on an MQTT bus.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIG. 1 is a schematic block diagram of one embodiment of a Message Queuing Telemetry Transport (MQTT) system 100 that can elect a new broker for a channel on an MQTT bus. At least in the illustrated embodiment, the MQTT system 100 includes, among other components, an MQTT bus 102 connecting and/or coupling a set of client devices 104 (or client(s) 104) to one another so that the client devices 104 are in communication with each other.

The MQTT bus 102 may include any suitable wired and/or wireless bus that is known or developed in the future that enables the set of client devices 104 to be coupled to and/or in communication with one another and/or to share resources (e.g., via an MQTT channel (or simply, channel). In various embodiments, the MQTT bus 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or sets of computing devices connected together for the purpose of communicating (e.g., video conferencing) with one another that are possible and contemplated herein.

The MQTT bus 102 may utilize any suitable communication protocol that is known or developed in the future that can utilize a publish and subscribe topic model for communication. In certain embodiments, the MQTT bus 102 utilizes an MQTT communication protocol that is based on the Transmission Control Protocol/Internet Protocol (TCP/IP). In other embodiments, the MQTT bus 102 is replaced with another messaging bus including, for example, Extensible Messaging and Presence Protocol (XMPP) or Advanced Message Queuing Protocol (AMQP), among other communication protocols that are possible and contemplated herein.

A client device 104 may include any suitable electronic device capable of accessing and/or communicating with one another and/or sharing resources with one another via a channel on the MQTT bus 102. Examples of a client device 104 include, but are not limited to, an Internet of Things (IoT) device, a portable/mobile computing device or personal portable/mobile computing device (e.g., a laptop computer, a personal digital assistant (PDA), a tablet computer, a smart phone, a smart watch, a cellular telephone, a wearable, a fitness tracker, smart shoes, earbuds/headphones, a smart device, and/or a digital assistant, etc.), a desktop computing device, and a smart TV, among other electronic devices that are possible and contemplated herein.

The MQTT system 100 may include any suitable quantity of client devices 104. As such, while FIG. 1 illustrates the MQTT system 100 as including five (5) client devices 104, the various embodiments of the MQTT system 100 are not limited to five client devices 104. That is, various other embodiments of the MQTT system 100 may include two (2) client devices 104, three (3) client devices 104, four (4) client devices 104, or any quantity of client devices 104 greater than five client devices 104.

In various embodiments, all of the client devices 102 in the MQTT system 102 are the same type of device. In alternative embodiments, all of the client devices 102 in the MQTT system 102 are different types of devices. In certain embodiments, at least two client devices 102 in the MQTT system 102 are different types of devices. In additional or alternative embodiments, at least two client devices 102 in the MQTT system 102 are the same type of device.

Figure 2A:
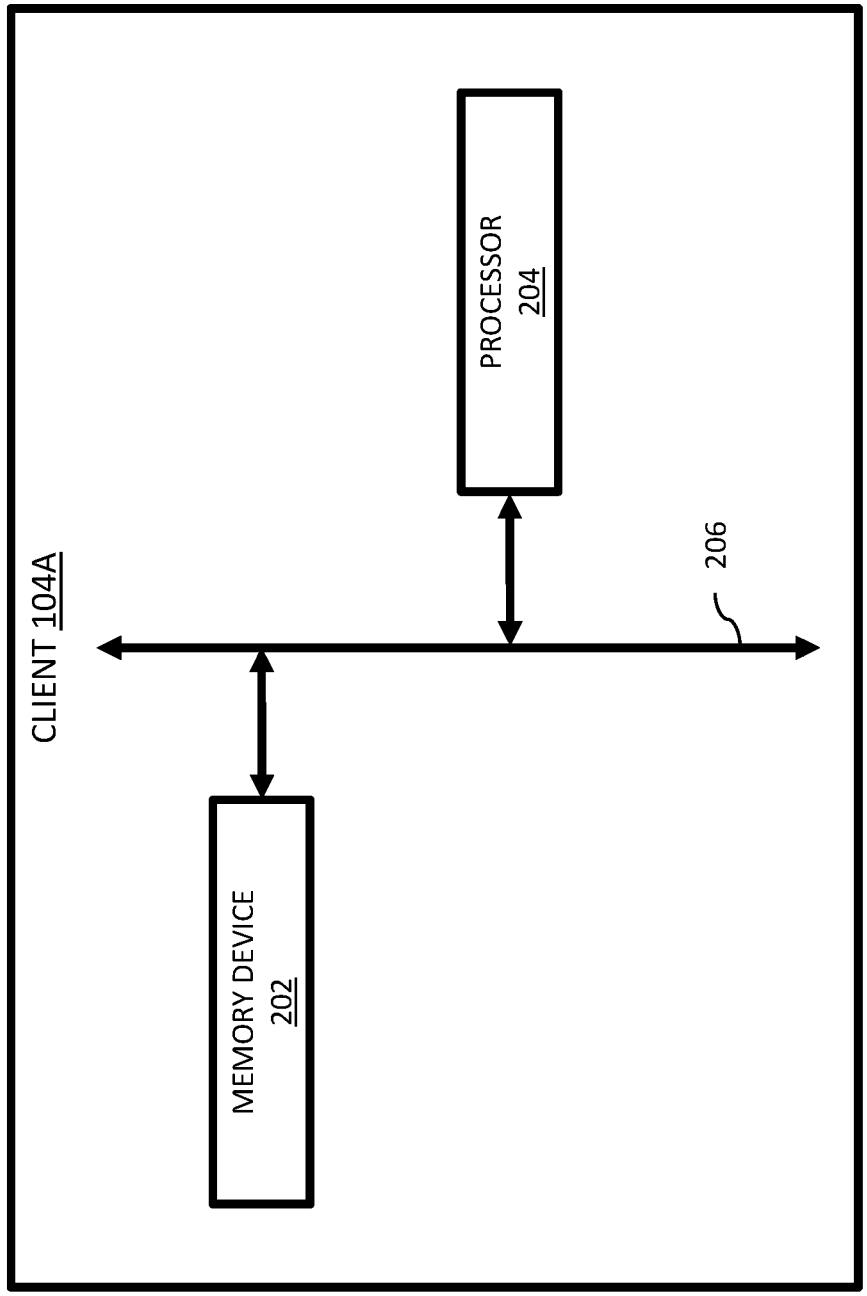
FIGS. 2A and 2B are schematic block diagrams of various embodiments of a client device included in the MQTT system of FIG. 1.

With reference to FIG. 2A, FIG. 2A is a block diagram of one embodiment of a client device 104. At least in the illustrated embodiment, the client device 104 includes, among other components, one or more memory devices 202 and a processor 204 coupled to and/or in communication with one another via a bus 206 (e.g., a wired and/or wireless bus).

A set of memory devices 202 may include any suitable quantity of memory devices 202. Further, a memory device 202 may include any suitable type of device and/or system that is known or developed in the future that can store computer-useable and/or computer-readable code. In various embodiments, a memory device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

A memory device 202, in some embodiments, includes volatile computer storage media. For example, a memory device 202 may include random access memory (RAM), including dynamic RAM (DRAM), synchronous dynamic RAM (SDRAM), and/or static RAM (SRAM). In other embodiments, a memory device 202 includes non-volatile computer storage media. For example, a memory device 202 may include a hard disk drive, a flash memory, and/or any other suitable non-volatile computer storage device that is known or developed in the future. In various embodiments, a memory device 202 includes both volatile and non-volatile computer storage media.

Figure 3A:
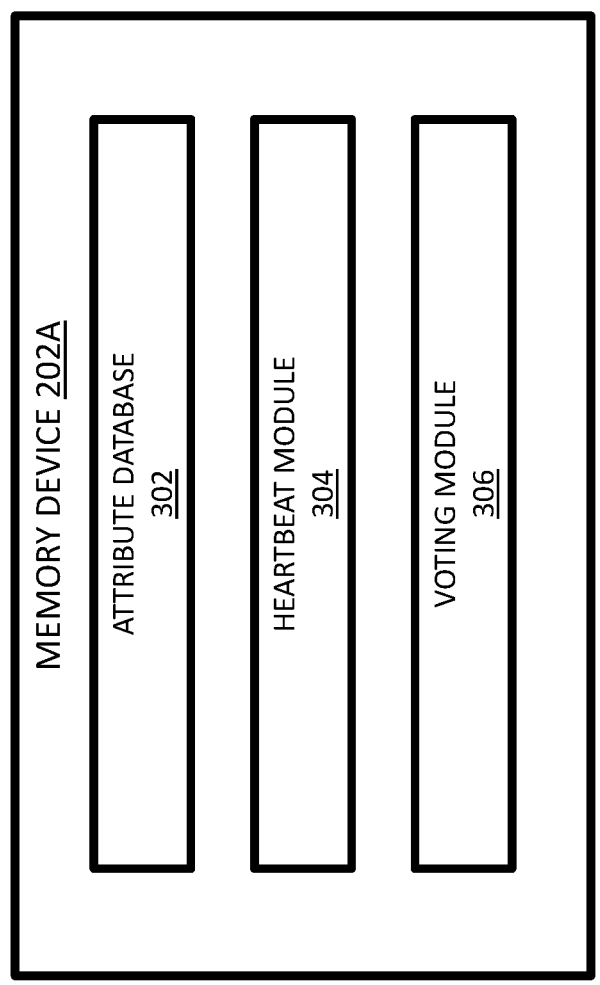
FIGS. 3A and 3B are schematic block diagrams of various embodiments of a memory device included in the client devices of FIGS. 2A and 2B.

With reference now to FIG. 3A, FIG. 3A is a schematic block diagram of one embodiment of a memory device 202A. At least in the illustrated embodiment, the memory device 202A includes, among other components, an attribute database 302, a heartbeat module 304, and a voting module 306 that are each configured to operate/function in conjunction with one another when executed by the processor 204 to manage power sharing in the electronic devices 104.

An attribute database 302 may include any suitable hardware and/or software that can manage and store data representing a set of one or more attributes for the client devices 104 in the MQTT system 100. In some embodiments, the attribute database 302 manages and stores data representing the attribute(s) for the other client devices 104 in the MQTT system 100. In additional or alternative embodiments, the attribute database 302 manages and stores data representing one or more of its own attributes, which is also considered one or more attributes of a client device 104 in the MQTT system 100.

The set of attributes stored in the attribute database 302 may include any quantity of attributes for a client device 104 that is suitable for a particular application of the MQTT system 100 and/or the client devices 104 in the MQTT system 100. In some embodiments, the attribute database 302 stores the same quantity of attributes for each client device 104. In other embodiments, the attribute database 302 stores a different quantity of attributes for each client device 104. In certain embodiments, the attribute database 302 stores different quantities of attributes for at least two client devices 104 and/or stores the same quantity of attributes for at least two client devices 104.

An attribute for the client devices 104 may include any type of attribute for a client device 104 that is known or developed in the future that is suitable for a particular application of the MQTT system 100 and/or the client devices 104 in the MQTT system 100. Example attributes for a client device 104 include, but are not limited to, state information (e.g., ON/OFF, online/offline, etc.), subscription(s), a type of computing device for the client device 104, a type of operating system (OS) on the client device 104, a version of the OS on the client device 104, an amount of time the client device 104 has been available on the MQTT bus 102, a length of time the client device 104 has been on the MQTT bus 102, a time when the client device 104 was added to the MQTT bus 102, a computing capacity (e.g., processing speed) of the client device 104, a memory capacity of the client device 104, and an amount of power available (e.g., AC and/or DC power) to the client device 104, etc., among other attributes that are possible and contemplated herein.

In some embodiments, the attribute database 302 stores the same attribute(s) for each client device 104. In other embodiments, the attribute database 302 stores different attribute(s) for each client device 104. In certain embodiments, the attribute database 302 stores different attribute(s) for at least two client devices 104 and/or stores the same attribute(s) for at least two client devices 104.

The attribute database 302 is in communication with the heartbeat module 304. In various embodiments, the attribute database 302 is configured to receive the data representing the attribute(s) for the other client devices 104 in the MQTT system 100 from the heartbeat module 302 and/or transmit the data representing the attribute(s) for itself to the heartbeat module 304.

A heartbeat module 304 may include any suitable hardware and/or software that can receive heartbeat messages from the other client devices 104 in the MQTT system 100 and/or generate and transmit heartbeat messages to the other client devices 104 in the MQTT system 100. In various embodiments, the heartbeat messages received from the other client devices 104 in the MQTT system 100 include data representing the attribute(s), as discussed above, for the to the other client devices 104 in the MQTT system 100. That is, the heartbeat module 304 is configured to receive heartbeat messages from each of the other client devices 104 in the MQTT system 100. Here, a first heartbeat message received from a client device 104 provides the attribute(s) in an initial state for the client device 104 that sent the first heartbeat message and each of the subsequent heartbeat messages provide an update the attribute(s) for the client device 104 that sent the subsequent heartbeat messages. The heartbeat module 304 is further configured to provide the attribute(s) data in each received heartbeat message to the attribute database 302 so that the attribute(s) for the client device 104 that transmitted the heartbeat message can be updated in the attribute database 302.

The heartbeat messages may be received from the other client devices 106 in the MQTT system 100 at any suitable interval(s) of time. In some embodiments, the heartbeat messages are received from the other client devices 106 in the MQTT system 100 are regular intervals of time, which can be any suitable interval of time and/or amount of time between heartbeat messages. In some embodiments, the heartbeat messages are randomly received from the other client devices 106 in the MQTT system 100, which can be any suitable randomness and/or asynchronous schedule. In still other embodiments, the heartbeat messages are received from the other client devices 106 in the MQTT system 100 in response to a predetermined event occurring on a client device 104, which can be any suitable event that can occur on a client device 104 (e.g., a software update, a software change, a hardware update, a hardware change, a configuration update, a configuration change, becoming available again, coming back online, etc., among other events that are possible and contemplated herein).

In various embodiments, the heartbeat messages generated and transmitted to the other client devices 104 in the MQTT system 100 include data representing the attribute(s), as discussed above, for the client device 104 are based on the attribute(s) stored for itself in the attribute database 302. That is, the heartbeat module 304 is configured to receive the data representing its own attribute(s) from the attribute database 302 and generate heartbeat messages include its own attribute(s). Here, a first heartbeat message generated by the client device 104 and transmitted to each of the other client devices 104 in the MQTT system 100 provides the attribute(s) in an initial state and each of the subsequent heartbeat messages provide an update the attribute(s) for the client device 104. The heartbeat module 304 is further configured to transmit the heartbeat messages that it generates to each of the client device 104 in the MQTT system 100 so that its attribute can be updated in the attribute databases 302 in each of the other client devices 104 in the MQTT system 100.

The heartbeat module 304 can generate and/or transmit its heartbeat messages to the other client devices 106 in the MQTT system 100 at any suitable interval(s) of time. In some embodiments, the heartbeat messages are generated and/or transmitted to the other client devices 106 in the MQTT system 100 at regular intervals of time, which can be any suitable interval of time and/or amount of time between heartbeat messages. In some embodiments, the heartbeat messages are randomly generated and/or transmitted to the other client devices 106 in the MQTT system 100, which can be any suitable randomness and/or asynchronous schedule. In still other embodiments, the heartbeat messages are generated and/or transmitted to the other client devices 106 in the MQTT system 100 in response to a predetermined event occurring on the client device 104, which can be any suitable event that can occur on a client device 104, as discussed elsewhere herein.

A voting module 306 may include any suitable hardware and/or software that can cast a set of votes for a particular client device 104 in the MQTT system 100 and/or on a channel of the MQTT bus 102 to elect the particular client device 104 as the new broker for a channel on the MQTT bus 102 and/or on the MQTT bus 102. The votes can be cast for one of the other client devices 106 on the channel of the MQTT bus 102 and/or on the MQTT bus 102 or for itself.

In various embodiments, the voting module 306 is configured to cast its vote(s) in response to the current broker of the channel on the MQTT bus 102 becoming unavailable (e.g., failing, going offline, etc. for a predetermined amount of time (e.g., any suitable amount of time)), which can result in the MQTT system 100, the MQTT bus 102, and/or the channel on the MQTT bus 102 becoming inoperable. As such, the voting module 306 may also be considered to cast its vote(s) in response to the MQTT system 100, the MQTT bus 102, and/or the channel on the MQTT bus 102 becoming inoperable.

The voting module 306 is configured to cast all of its votes for the same client device 104, which will be one of the other client devices 104 in the MQTT system 100, on the MQTT bus 102, on the channel of the MQTT bus 102 or itself. The voting module 306 is configured to cast all of its votes for a particular client device 104 based on the attribute(s) of each of the client devices 104 (e.g., the other client devices 104 and itself) stored in the attribute database 302.

In various embodiment, the voting module 306 is configured to select which client device 104 to cast its votes for based on a weighted value assigned to one or more or each attribute for the client devices 104. The weighted value can be any suitable weighting value based on any suitable factor(s) that is/are known or developed in the future. In some embodiments, the attribute(s) is/are weighted based on the application and/or purpose for which the MQTT system 100 and/or the channel on the MQTT bus 102 was created, among other weightings that are possible and contemplated herein.

In some embodiments, all of the attributes for the client devices 104 are weighted the same. In other embodiments, all of the attributes for the client devices 104 are weighted differently based on one or more factors and/or criteria. In certain embodiments, at least two of the attributes for the client devices 104 are weighted the same and/or at least two the attributes for the client devices 104 are weighted differently based on one or more factors and/or criteria. For example, the amount of time that a client device 104 has been available on the channel, on the MQTT bus 102, and/or in the MQTT system 100 may be weighted more heavily than the device type of the client devices 104, among other examples of different weightings and/or factors that are possible and contemplated herein.

In short, the voting module 306 is configured to apply a weighting process (e.g., calculate a weighted score) for each client device 106, determine which client device 104 to vote for based on the results of the weighting process (e.g., the client device 104 with the highest or lowest weighted score), and cast all of its votes for the client device 104 that resulted from and/or won the weighting process (e.g., the client device 104 with the highest or lowest weighted score).

Notably, the voting modules 306 in each of the client devices 104 include the same voting criteria and weighting process. As such, even though different client devices 104 may be entitled to cast different quantities of votes, each client device 104 will cast (or should cast) all of its votes for the same client device 104 as the other client devices 104. In other words, the voting by all of the client devices 104 should be unanimous.

In various embodiments, the voting module 306 is configured to vote for a backup broker. In some embodiments, the voting module 306 casts votes for the new broker and the backup broker at the same time. In other embodiments, the voting module 306 casts its vote(s) for the backup broker in a separate election that is similar to the voting process in electing the new broker.

In certain embodiments, the voting module 306 votes for the new broker and the backup broker in the same election the first time that a broker becomes unavailable. Here, each subsequent time that a broker becomes unavailable, the current backup broker is promoted as the new broker and, in response to the current backup broker being promoted to the new broker, the voting module 306 selects and casts its votes for a client device 104 to be elected as the new backup broker. In this manner, the amount of time that the MQTT system 100 would be down or inoperable for lack of a broker is minimized or at least reduced.

In additional or alternative embodiments, the voting module 306 votes for the new broker and the backup broker in the same election in response to the broker and the backup broker becoming unavailable or being unavailable at the same time. Here, the voting module 306 casts its vote(s) for the broker similar to the discussion above and is further configured to cast its vote(s) for the backup broker based on the client device 104 that came in second place in the process that utilized the attribute(s) of the client devices 104 to select the client device 104 for the voting process, as discussed above, which may also include weighting of the attribute(s) that is also discussed above. In some embodiments, each subsequent time that a broker becomes unavailable, the current backup broker is promoted as the new broker and the voting module 306 selects and casts its votes for a client device 104 to be elected as the new backup broker similar to the voting process for the new broker discussed above. Again, the amount of time that the MQTT system 100 would be down or inoperable for lack of a broker can be minimized or at least reduced.

Figure 3B:
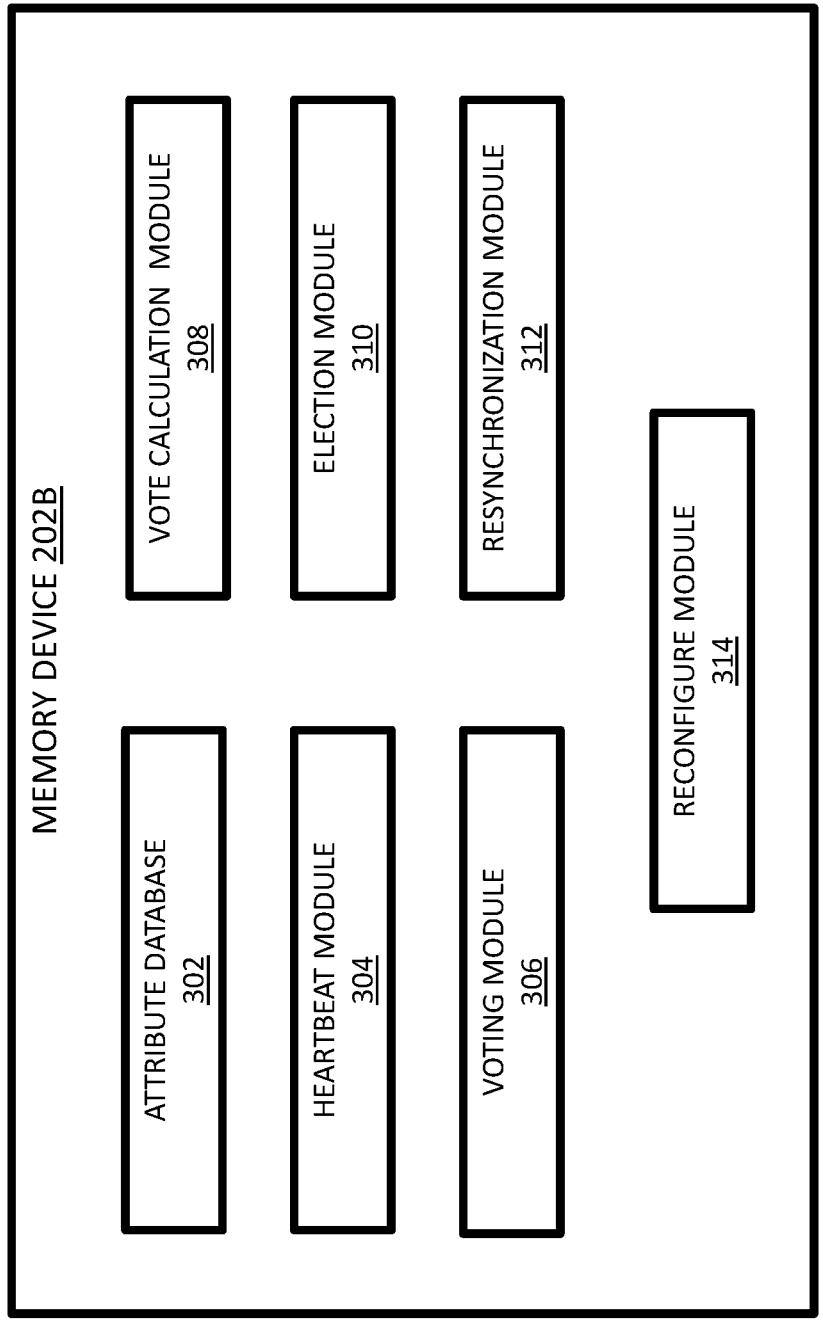

Referring now to FIG. 3B, FIG. 3B is a block diagram of another embodiment of a memory device 202B. The memory device 202B includes an attribute database 302, a heartbeat module 304, and a voting module 306 similar to the attribute database 302, the heartbeat module 304, and the voting module 306 included in the memory device 202A discussed above with reference to FIG. 3A. At least in the illustrated embodiment, the memory device 202B further includes, among other components, a vote calculation module 308, an election module 310, a resynchronization module 312, and a reconfiguration module 314.

A vote calculation module 308 may include any suitable hardware and/or software that can calculate a quantity of votes that the client device 104 is entitled to cast in electing a new broker. The vote calculation module 308 is further configured to transmit the quantity of votes calculated for the client device 104 to the voting module 306 so that the voting module 306 casts the correct quantity of votes.

The quantity of votes that a client device 104 is entitled to cast in electing a new broker may be calculated by the vote calculation module 308 based on any factor(s) and/or criteria that is/are suitable for a particular MQTT system 100, MQTT bus 102, MQTT channel, and/or application(s) thereof. In some embodiments, the quantity of votes is calculated by the vote calculation module 308 based on one or more attributes of the client device 104. Example attributes for calculating a quantity of votes that the client device 104 is entitled to cast include, but are not limited to, state information (e.g., ON/OFF, online/offline, etc.), subscription(s), a type of computing device for the client device 104, a type of OS on the client device 104, a version of the OS on the client device 104, an amount of time the client device 104 has been available on the MQTT bus 102, a length of time the client device 104 has been on the MQTT channel and/or MQTT bus 102, a time when the client device 104 was added to the MQTT channel and/or MQTT bus 102, a computing capacity (e.g., processing speed) of the client device 104, a memory capacity of the client device 104, and an amount of power available (e.g., AC and/or DC power) to the client device 104, etc., among other attributes that are possible and contemplated herein. For example, one or more or each of the attributes may be assigned a quantity of votes.

In some embodiments, all of the attributes for the client devices 104 are assigned the same quantity of votes. In other embodiments, all of the attributes for the client devices 104 are assigned a different quantity of votes based on one or more factors and/or criteria. In certain embodiments, at least two of the attributes for the client devices 104 are assigned the same quantity of votes and/or at least two the attributes for the client devices 104 are assigned different quantities of votes based on one or more factors and/or criteria. For example, including an amount of battery life greater than a threshold level may include an extra vote and/or a newer version of an OS may be entitled to more votes than an older version of the same OS, among other factors and/or examples that are possible and contemplated herein.

In certain embodiments, the quantity of votes calculated for one or more attributes may be increased or decreased based on a weighting factor for the attribute(s). The weighting factor for the attributes, in some embodiments, may increase or decrease the quantity of votes for all of the attributes the same amount. In other embodiments, the weighting factor for the attributes may increase or decrease the quantity of votes for all of the attributes different amounts based on one or more factors and/or criteria. In certain embodiments, the weighting factor for the attributes may increase or decrease the quantity of votes for at least two of the attributes the same amount and/or the weighting factor for the attributes may increase or decrease the quantity of votes for at least two of the attributes by different amounts based on one or more factors and/or criteria.

An election module 310 may include any suitable hardware and/or software that can elect a broker and/or a backup broker for the channel on the MQTT bus 102. The election module 310 is further configured to elect the broker and/or the backup broker based on the votes cast by all of the client devices 104.

In various embodiments, the election module 310 is configured to receive the votes for a new broker cast by its own voting module 306 (but not the votes for a new broker cast by the voting module 306 in each of the other client devices 104). The election module 310 is further configured to tally and/or count all of the votes for the new broker and elect the client device 104 that received that greatest quantity of votes as the new broker. In some embodiments, the election module 310 is configured to elect the client device 104 that received that second greatest quantity of votes as the backup broker.

In additional embodiments (e.g., when a backup broker has been promoted to the new broker), the election module 310 is configured to receive the votes cast for a backup broker by its own voting module 306 and the votes for a backup broker cast by the voting module 306 in each of the other client devices 104. The election module 310 is further configured to tally and/or count all of the votes and elect the client device 104 that received that greatest quantity of votes as the backup broker.

As noted above, the voting should be unanimous, and all of the client devices 104 should agree on which client device 104 should be the new broker and/or backup broker. In other words, each client device 104 should reach the same conclusion and elect the same client device 104 as the new broker and/or backup broker. However, in some instances two or more client devices 104 may be tied because they received the same quantity of votes. Thus, in some embodiments, the election module 310 is configured to break the tie using one or more tie break processes, which can be a tie for broker and/or for backup broker.

A tie break process performed by the election module 310 may include any suitable factor and/or criteria that is known or developed in the future related to a particular MQTT system 100, MQTT bus 102, channel on the MQTT bus 102, and/or application(s) of such. In some embodiments, the tie break process selects a winner based on one or more attributes for the client devices 104. For example, the winner may be the client device 104 that includes the fastest processing speed, the most available memory, and/or the most battery life, etc., among other attributes that are possible and contemplated herein.

Here, the election module 310 is configured to elect the winner of the tie break process as the new broker. In additional embodiments, the election module 310 is configured to elect the loser of the tie break process as the backup broker. If, however, there still remains a tie, the election module 310 may perform an additional tie break process. In certain embodiments (e.g., in a backup broker election), the election module 310 is configured to elect the winner of the tie break process as the backup broker.

The additional break process performed by the election module 310 may include any suitable factor and/or criteria that is known or developed in the future related to a particular MQTT system 100, MQTT bus 102, channel on the MQTT bus 102, and/or application(s) of such. In some embodiments, the tie break process selects a winner based on one or more further attributes for the client devices 104. For example, the winner may be the client device 104 that was added to the MQTT system 100, MQTT bus 102, and/or channel before or after the other client device(s) 104 or the client device 104 that has been available and/or online the longest or shortest amount of time, etc., among other attributes that are possible and contemplated herein. Here, the election module 310 is configured to elect the winner of the additional tie break process as the broker. In additional embodiments, the election module 310 is configured to elect the loser of the additional tie break process as the backup broker. In certain embodiments (e.g., in a backup broker election), the election module 310 is configured to elect the winner of the additional tie break process as the backup broker.

Again, the voting should be unanimous, and all of the client devices 104 should agree on which client device 104 should be the new broker and/or backup broker because all of the client devices 104 include the same one or more tie break processes. In other words, all of the client devices 104 should agree on the winner(s) of the tie break process (or agree on another tie) and the winner(s) of the additional tie break process.

Further, in certain situations the voting module 306 may cast its votes for a client device 104 that is different than the client device 104 voted for by the other client devices 104 100 (e.g., voted for the "wrong" client device 104 to be the new and/or backup broker and/or voted for the "wrong" new and/or broker). Typically, the voting module 306 will deviate from voting the same as the other client devices 104 because the voting module 306 selected/voted for a particular client device 104 based on outdated attribute data for itself and/or outdated attribute data for one or more of the other client devices 104, which can result from the client device 104 having not received one or more heartbeat messages from one or more of the other client devices 104 because the client device 104 failed, went offline, or otherwise became unavailable. Here, in response to selecting and voting for the wrong client device 104 and/or wrong new and/or backup broker, the client device 104 may have prematurely reconfigured itself as the new broker (when it should have remained a subscriber) and received subscriber messages from the client device 104 elected as the new broker when it was not expecting to receive subscriber messages, remained a subscriber when it should have reconfigured itself as the new broker and did not receive any subscriber messages from a broker (e.g., the newly elected broker), or received subscriber messages from a client device 104 (e.g., the newly elected broker) that the client device 104 did not expect to receive subscriber messages from because the client device 104 expected to receive the subscriber messages from the client device 104 that the client device 104 had voted for (e.g., the wrong client device 104 and/or the wrong new broker).

In various embodiments, the election module 310, in response to any of the above situations occurring, is configured to notify the resynchronization module 312 that one of the above situations has occurred, the situation that occurred, identifies the client device 104 was elected as the new broker, identifies the client device 104 that should be elected as the new broker, and/or identifies the client device 104 that the client device 104 should have voted for as the new broker. In other words, the notification informs the resynchronization module 312 that an error has occurred and/or that the client device 104 should confirm the results of the election.

A resynchronization module 312 may include any suitable hardware and/or software that can perform a resynchronization process to resynchronize and/or facilitate updating attribute data for one or more client devices 104 stored in the attribute database 302. The resynchronization process may further confirm the results of a new broker election based on the resynchronized and/or updated attribute data for the client device(s) 104 stored in the attribute database 302.

In various embodiments, the resynchronization module 312 is configured to perform the resynchronization process that resynchronizes and/or facilitates updating the attribute data for the one or more client devices 104 stored in the attribute database 302, which can include its own attribute(s), in response to receiving an error notification from the election module 310. Further, the resynchronization module 312 is configured to prompt the voting module 306 to perform an additional selection process for selecting a new broker based on the newly updated/resynchronized attribute data in the attribute database 302 for the client device(s) 104. Here, the additional selection process should produce the correct vote and/or election result (e.g., the client device 104 voting for and/or electing the same new broker that the other client devices 104 voted for and/or elected), which the resynchronization module 312 is configured to confirm based on a match.

A reconfiguration module 314 may include any suitable hardware and/or software that can reconfigure the client device 104 based on the results of a new broker election and/or resynchronization process. In various embodiments, the reconfiguration module 314 is configured to reconfigure the client device 104 to be a broker or a subscriber to a newly elected broker based on the results of a broker election and/or resynchronization process. That is, the reconfiguration module 314 is configured to reconfigure the client device 104 to be a broker of a channel on the MQTT bus 102 and enable the client device 104 to function/operate as the broker in response to the client device 104 being elected as the new broker of the channel and/or in response to the client device 104 confirming a resynchronization process that indicates that the client device 104 was elected broker of the channel and/or should have been elected broker of the channel. In addition, the reconfiguration module 314 is configured to reconfigure the client device 104 to be a subscriber of a channel with a new broker and function/operate as the subscriber of the channel in response to a new client device 104 being elected as the new broker and/or in response to the client device 104 confirming a resynchronization process that indicates that the new client device 104 was elected broker of the channel and/or should have been elected broker of the channel.

Referring back to FIG. 2A, a processor 204 may include any suitable non-volatile/persistent hardware and/or software configured to perform and/or facilitate performing functions and/or operations for electing a new broker of a channel on the MQTT bus 102. In various embodiments, the processor 204 includes hardware and/or software for executing instructions in one or more modules and/or applications that can perform and/or facilitate performing functions and/or operations for electing a new broker for a channel on the MQTT bus 102. The modules and/or applications executed by the processor 204 for electing a new broker for a channel on the MQTT bus 102 can be stored on and executed from one or more memory devices 202 and/or from the processor 204.

Figure 4A:
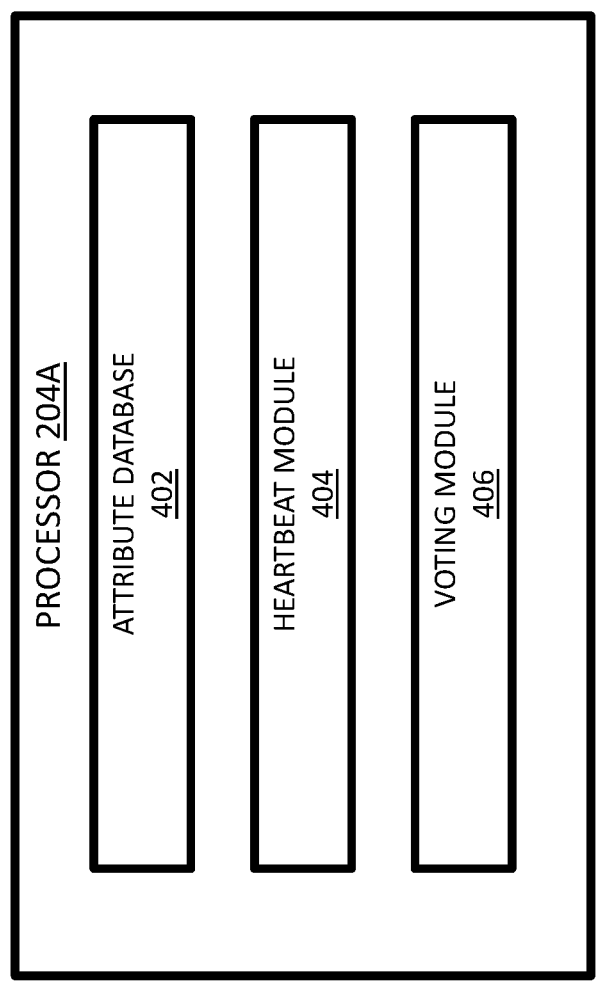
FIGS. 4A and 4B are schematic block diagrams of various embodiments of a processor included in the client devices of FIGS. 2A and 2B.

With reference to FIG. 4A, FIG. 4A is a schematic block diagram of one embodiment of a processor 204A. At least in the illustrated embodiment, the processor 204A includes, among other components, an attribute database 402, a heartbeat module 404, and a voting module 406 similar to the attribute database 302, heartbeat module 304, and voting module 306 in the memory device 202A discussed with reference to FIG. 3A.

Figure 4B:
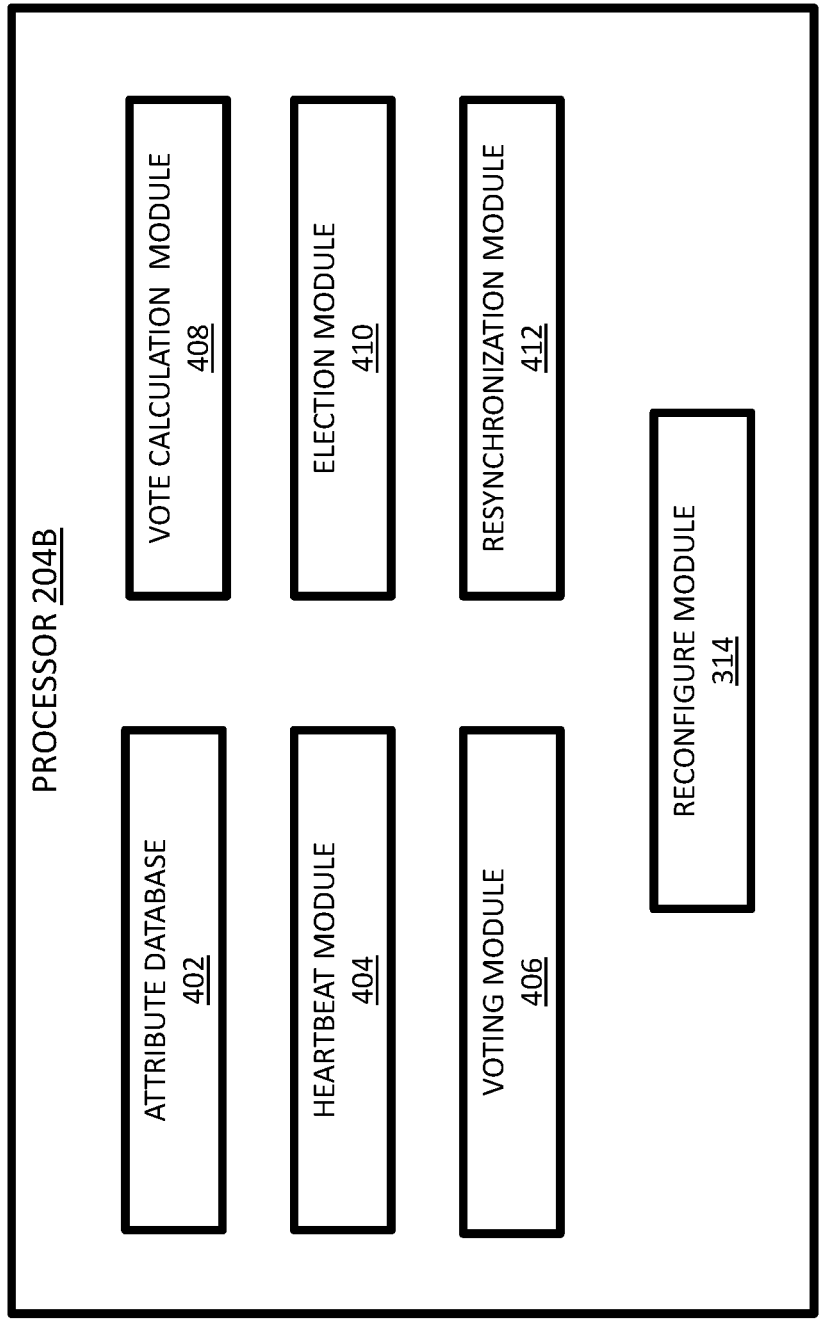

Referring to FIG. 4B, FIG. 4B is a schematic block diagram of another embodiment of a processor 204B. At least in the illustrated embodiment, the processor 204B includes, among other components, an attribute database 402, a heartbeat module 404, a voting module 406, a vote calculation module 408, an election module 410, a resynchronization module 412, and a reconfiguration module 414 similar to the attribute database 302, heartbeat module 304, voting module 306, vote calculation module 308, election module 310, resynchronization module 312, and the reconfiguration module 314 in the memory device 202B discussed with reference to FIG. 3B.

Figure 2B:
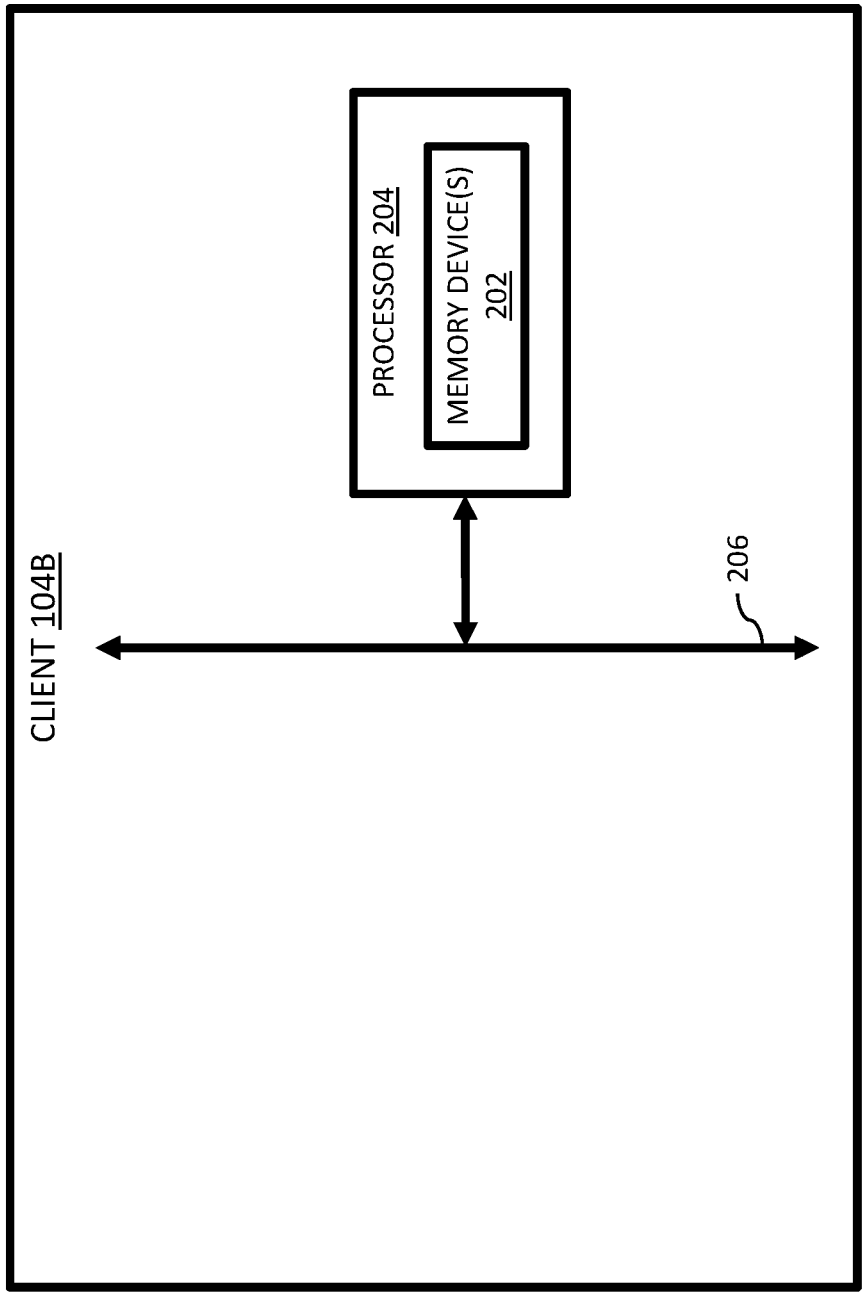

Turning now to FIG. 2B, FIG. 2B is a block diagram of another embodiment of a client device 104B. The client device 104B includes, among other components, one or more memory devices 202 and a processor 204 similar to the client device 104A discussed elsewhere herein. Alternative to the client device 104A, the processor 204 in the client device 104B includes the memory device 202 as opposed to the memory device 202 of the client device 104A being a different device than and/or independent of the processor 204.

With reference again to FIG. 1, one of the client devices 104 is designated as the broker of a channel on the MQTT bus 102 when the MQTT channel is created. Which client device 104 is selected as the first broker may be based on any suitable factor and/or criteria. In some embodiments, the first client device 104 that is added to the channel on the MQTT bus 102 is selected as the broker, among other factors and/or criteria that are possible and contemplated herein.

As discussed above, the client devices 104 can elect a new broker for a channel on the MQTT bus 102 in response to the current broker of the channel becoming unavailable. As such, the various embodiments disclosed herein can provide a lightweight self-healing MQTT-based network and/or MQTT system 100. In other words, the various embodiments provide for the locality of data and/or information to allow and/or enable recovery from an unavailable broker on a channel and/or MQTT bus 102 by selecting/electing a new broker without having to manually reconfigure the MQTT system 100 or providing clustering and/or DNS services. In other words, the various embodiments of the MQTT system 100 are able to automatedly and/or automatically elect a new broker for a channel and/or MQTT bus 102 in response to the current broker becoming unavailable (e.g., for a predetermined amount of time).

Further, the voting process discussed herein does not utilize any network communication between the client devices 104 during the election of a new broker and/or backup broker because each client device 104 runs its own election process. In other words, each client device 104 performs an independent election process. Further, the elected new broker (which was elected by itself (and the other client devices 104)) sets itself up as the new broker and then resumes network communications (e.g., subscriber messages) with the other client devices 104 (e.g., subscribers). Thus, the results of the election are confirmed by the other client device 104 (e.g., non-elected and non-broker client devices 104) by the other client devices 104 having not reconfigured themselves as the new broker and/or their willingness to receive subscriber messages from the new broker, which can be considered a passive confirmation.

FIGS. 5A through 5D are diagrams illustrating one embodiment of operations for electing a new broker for a channel on an MQTT bus 102 in an embodiment of an MQTT system 500. At least in the illustrated embodiment, the MQTT system 500 includes an MQTT bus 102 coupling a set of client devices 104 (e.g., client device 104A, client device 104B, client device 104C, client device 104D, and client device 104E), which includes five client devices 104, but may include any suitable quantity of client devices 104, as discussed elsewhere herein.

Figure 5A:
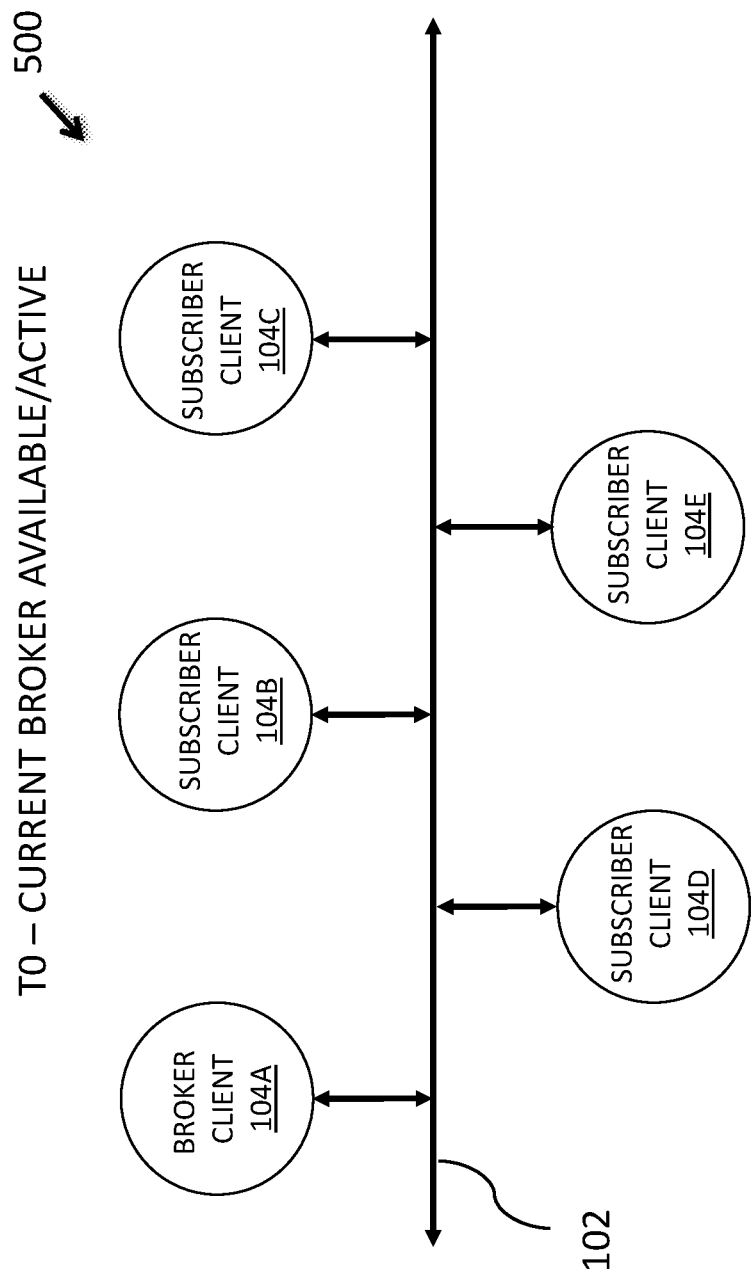
FIGS. 5A through 5D are diagrams illustrating one embodiment of operations for electing a new broker for a channel on an MQTT bus in an embodiment of an MQTT system.

In FIG. 5A, which depicts the MQTT system 500 at time T0, the client device 104A elects itself as the broker of a channel on the MQTT bus 102 and/or the MQTT bus 102 because the client device 102A is, for example, the first client device 104 added to the channel and/or the MQTT bus 102, among other factors that can determine which client device 104 is the first broker. In addition, FIG. 5A shows that client device 104B, client device 104C, client device 104D, and client device 104E are subscribers of the channel and/or on the MQTT bus 102.

Further, at time T0, client device 104A, client device 104B, client device 104C, client device 104D, and client device 104E generate and transmit to each other heartbeat messages that include data about their respective attribute(s), as discussed elsewhere herein. In addition, each of client device 104A, client device 104B, client device 104C, client device 104D, and client device 104E update their own attribute data and the attribute data for the other client devices 104 in their respective attribute databases 302 as the heartbeat messages are received from each of the other client devices 104, as discussed elsewhere herein.

Figure 5B:
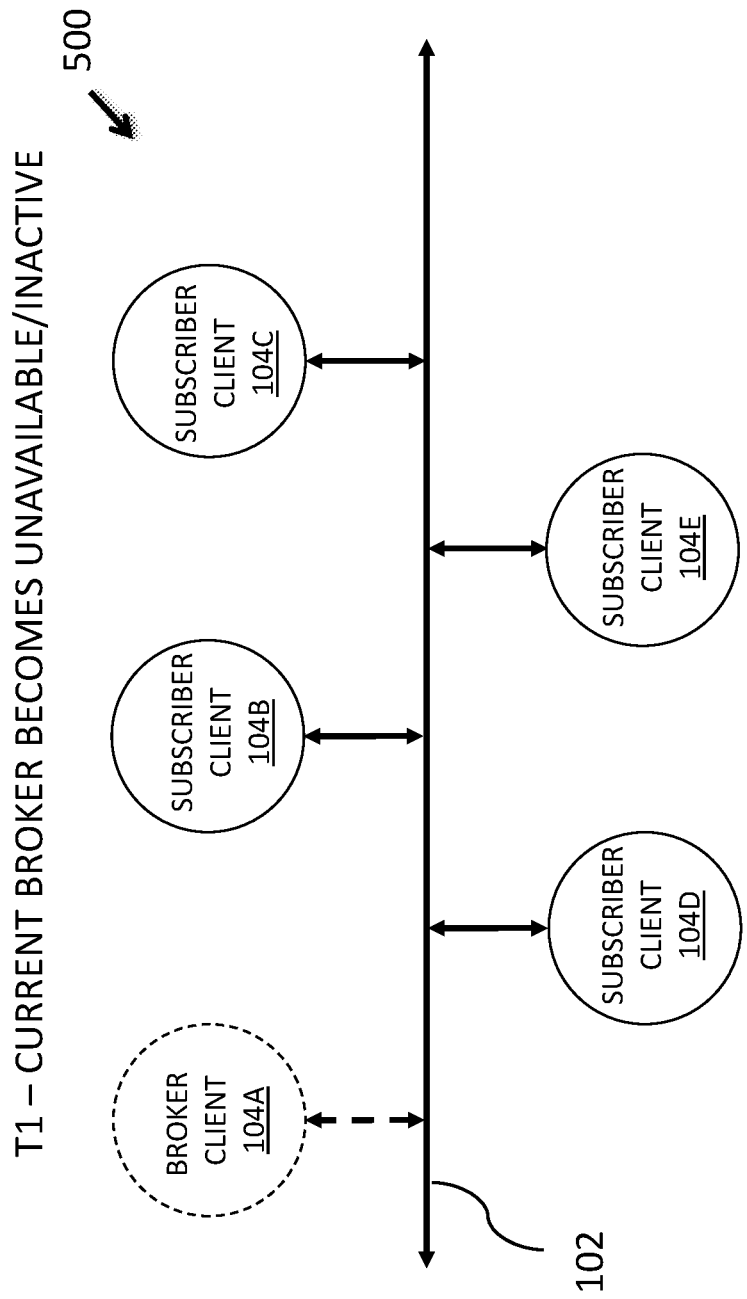

At time T1, which is shown in FIG. 5B, the broker (e.g., client device 104A) becomes unavailable and/or inactive (e.g., is not transmitting heartbeat messages and/or subscriber messages) for a predetermined amount of time, which is represented by the client device 104A including dashed lines. In addition, after the broker (e.g., client device 104A) is unavailable and/or inactive for the predetermined amount of time, the client device 104B, client device 104C, client device 104D, and client device 104E detect that the broker (e.g., client device 104A) is inactive.

Figure 5C:
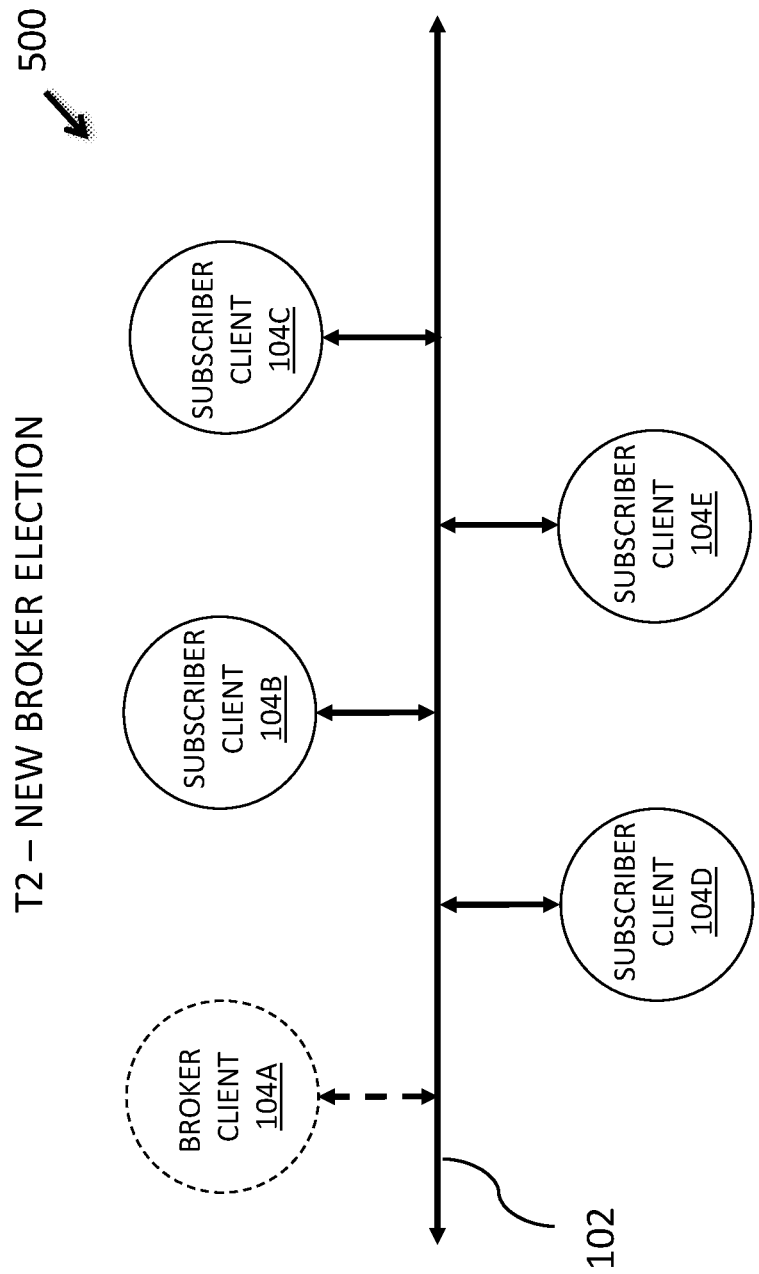

In FIG. 5C, which occurs at time T2, the client device 104B, client device 104C, client device 104D, and client device 104E each perform their respective vote quantity calculating functions to determine how many votes they are entitled to cast and vote casting functions to cast their votes for a respectively selected one of the client device 104B, client device 104C, client device 104D, and client device 104E as the new broker, which could be itself, as discussed elsewhere herein. Further, the client device 104B, client device 104C, client device 104D, and client device 104E count and/or tally all of the votes and elect the client device 104B, client device 104C, client device 104D, or client device 104E as the new broker, which should be a unanimous result.

In response to a tie, the client device 104B, client device 104C, client device 104D, and client device 104E may each perform one or more respective tie break processes, as discussed elsewhere herein. In addition, in response to the client device 104B, client device 104C, client device 104D, and/or client device 104E not voting for and/or electing the same client device 104 as the broker as the other client devices 104, the client device 104B, client device 104C, client device 104D, and/or client device 104E may perform a resynchronization process so that the client device 104B, client device 104C, client device 104D, and/or client device 104E can confirm that the correct broker should have been voted for and/or was elected, as discussed elsewhere herein.

Figure 5D:
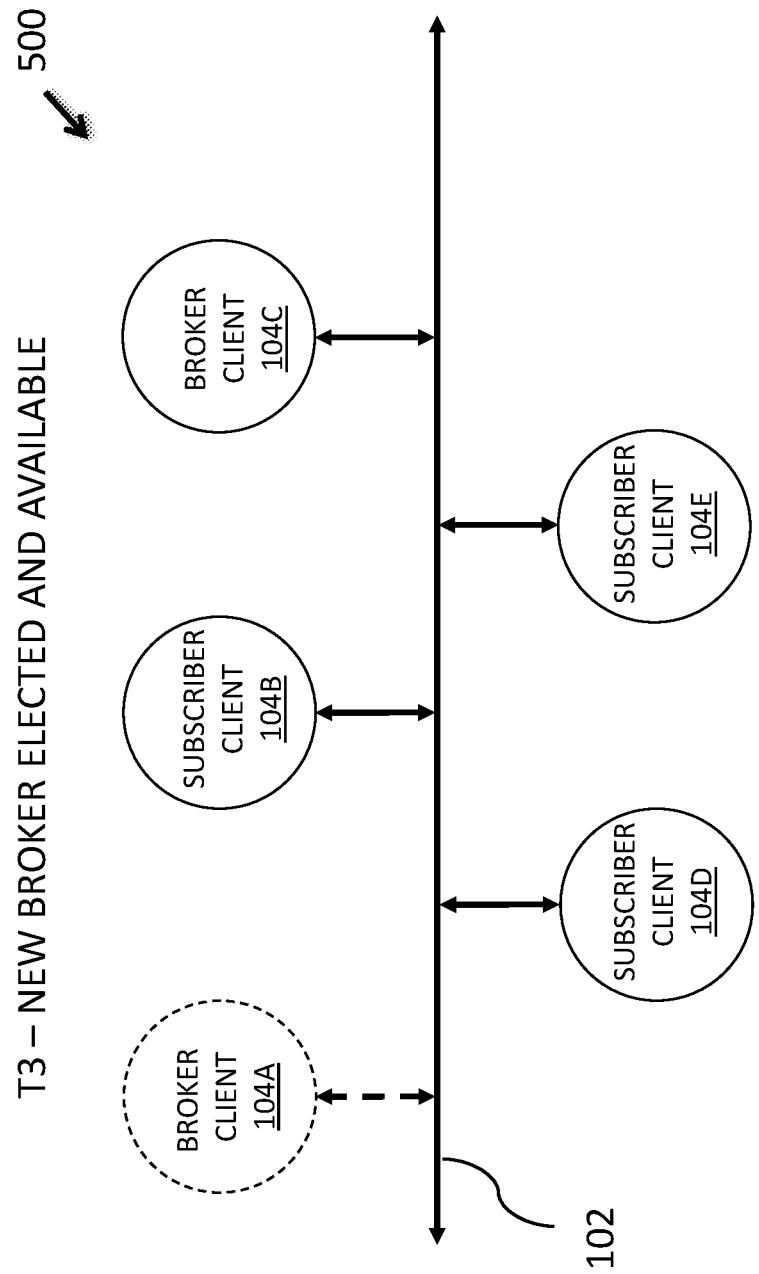

In FIG. 5D, which occurs at time T3, should have been voted the client device 104C is elected as the new broker. The client device 104C then reconfigures itself to be the broker and can begin transmitting subscriber messages and heartbeat messages to the client device 104B, client device 104D, and client device 104E. Further, the client device 104B, client device 104D, and client device 104E are subscribers and can receive the subscriber messages and heartbeat message from the new broker (the client device 104C), receive the heartbeat message from the client device 104B, client device 104D, and client device 104E, and update their respective attribute databases 302 with the attribute data, as discussed elsewhere herein.

Figure 6:
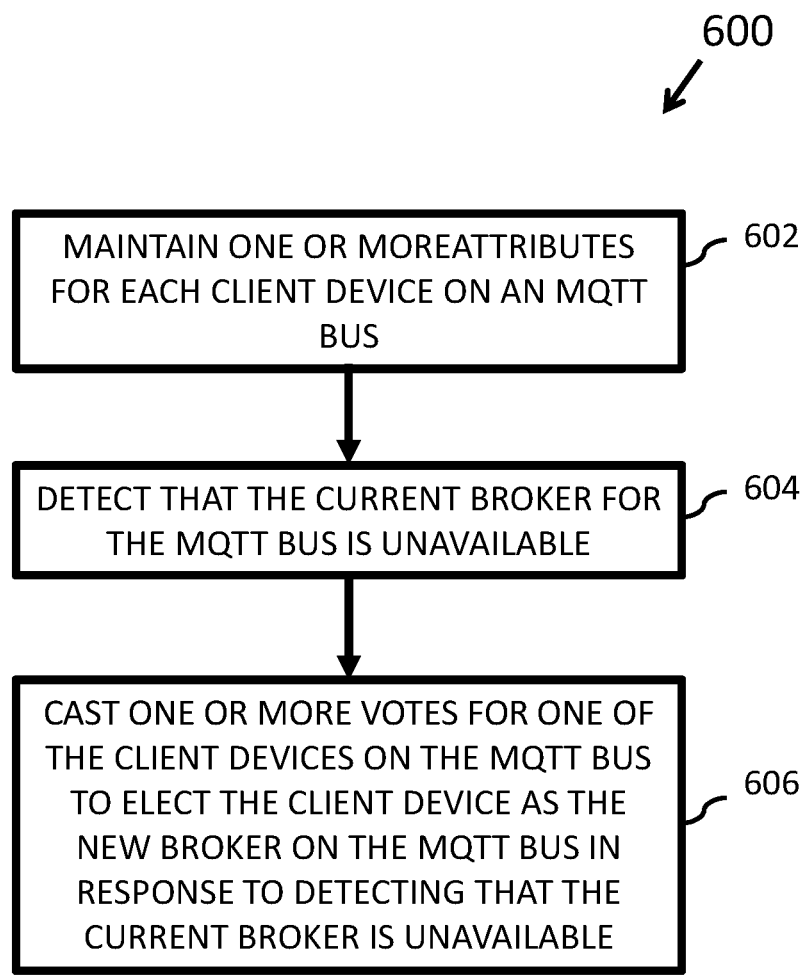
FIGS. 6 through 8 are flow diagrams of various embodiments of methods for electing a new broker of a channel on an MQTT bus.

FIG. 6 is a schematic flow chart diagram illustrating one embodiment of a method 600 for electing a new broker for a channel on an MQTT bus 102. At least in the illustrated embodiment, the method 600 begins by a processor (e.g., processor 204) maintaining a set of one or more attributes in an attribute database 302 for each client device 104 of a channel on an MQTT bus 102 (block 602). The attribute(s) may be updated in the attribute database 302 with attribute data received in heartbeat messages received from each of the other client devices 104 of the channel on the MQTT bus 102, as discussed elsewhere herein.

The method 600 further includes the processor 204 detecting that the current broker (e.g., another client device 104 of the channel on the MQTT bus 102) has become unavailable (block 604). The current broker may be determined as being unavailable in response to the current broker not transmitting heartbeat messages and/or subscriber messages for a predetermined amount of time.

In response to the current broker being unavailable, the processor 204 casts one or more votes for a client device 104 on the MQTT bus 102, which could be itself, to elect the client device 104 as the new broker (block 606). While method 600 is discussed as being performed by one of the client devices 104 on the MQTT bus 102, various other embodiments of the method 600 include all of the client devices 104 on the MQTT bus 102 performing the method 600 to cast its respective votes in electing a new broker.

Figure 7:
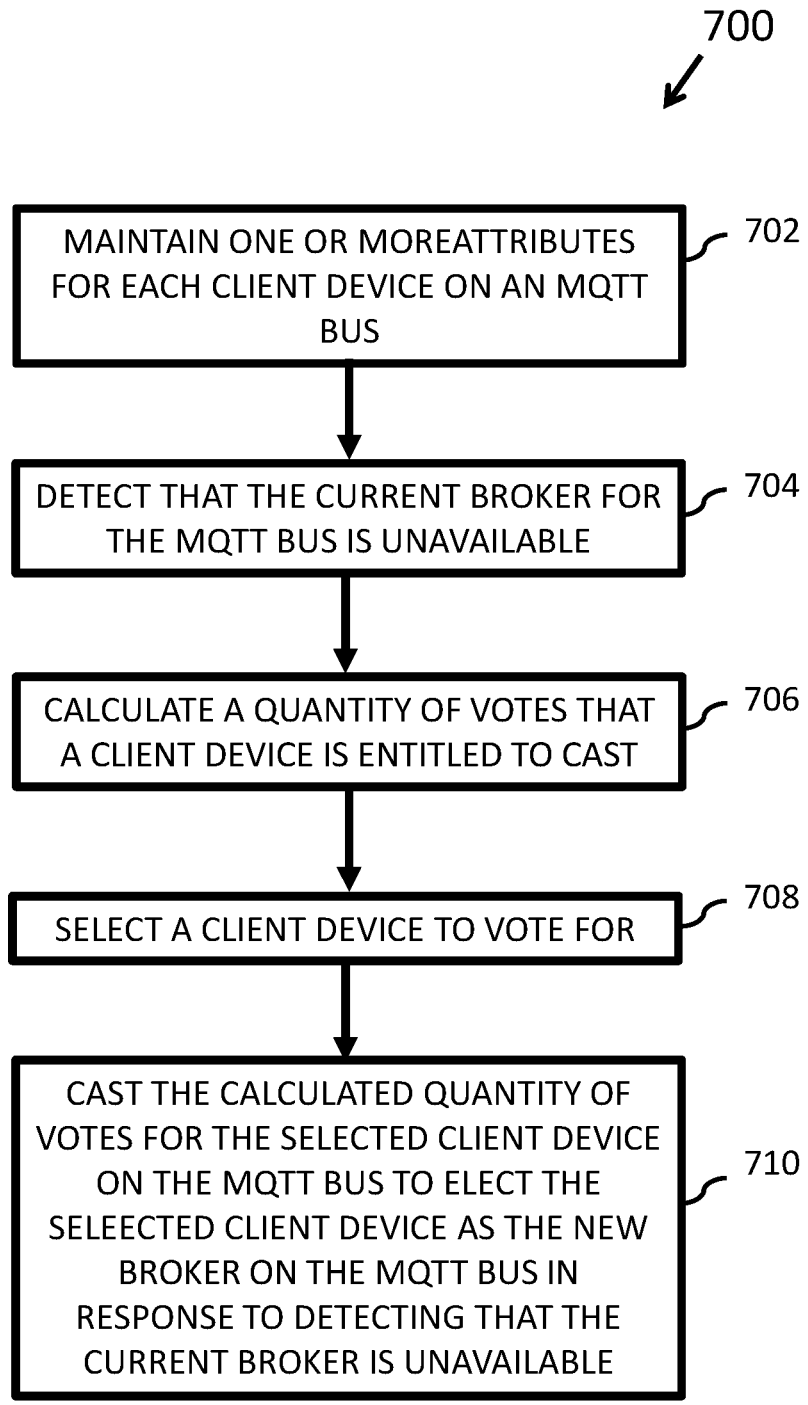

FIG. 7 is a schematic flow chart diagram illustrating another embodiment of a method 700 for electing a new broker for a channel on an MQTT bus 102. At least in the illustrated embodiment, the method 700 begins by a processor (e.g., processor 204) maintaining a set of one or more attributes in an attribute database 302 for each client device 104 of a channel on an MQTT bus 102 (block 702). The attribute(s) may be updated in the attribute database 302 with attribute data received in heartbeat messages received from each of the other client devices 104 of the channel on the MQTT bus 102, as discussed elsewhere herein.

The method 700 further includes the processor 204 detecting that the current broker (e.g., another client device 104 of the channel on the MQTT bus 102) has become unavailable (block 704). The current broker may be determined as being unavailable in response to the current broker not transmitting heartbeat messages and/or subscriber messages for a predetermined amount of time.

In response to the current broker being unavailable, the processor 204 calculates the quantity of votes that the client device 104 is entitled to vote (block 706). The quantity of votes may be based on one or more attributes of the client device 104 and one or more attributes of the client device 104 may be weighted to increase or decrease the quantity of votes the client device 104 is able to cast, as discussed elsewhere herein.

The method 700 further includes the processor 204 selecting one of the client devices 104 on the MQTT bus 102, which could be itself, to vote for (block 708). The selected client device 104 may be selected based on one or more attributes of the selected client device 104 and one or more attributes may be weighted during the selection process, as discussed elsewhere herein.

The processor 204 casts the calculated quantity of votes for the selected client device 104, which could be itself, to elect the selected client device 104 as the new broker (block 710). While method 700 is discussed as being performed by one of the client devices 104 on the MQTT bus 102, various other embodiments of the method 700 include all of the client devices 104 on the MQTT bus 102 performing the method 700 to cast its respective votes in electing a new broker.

Figure 8:
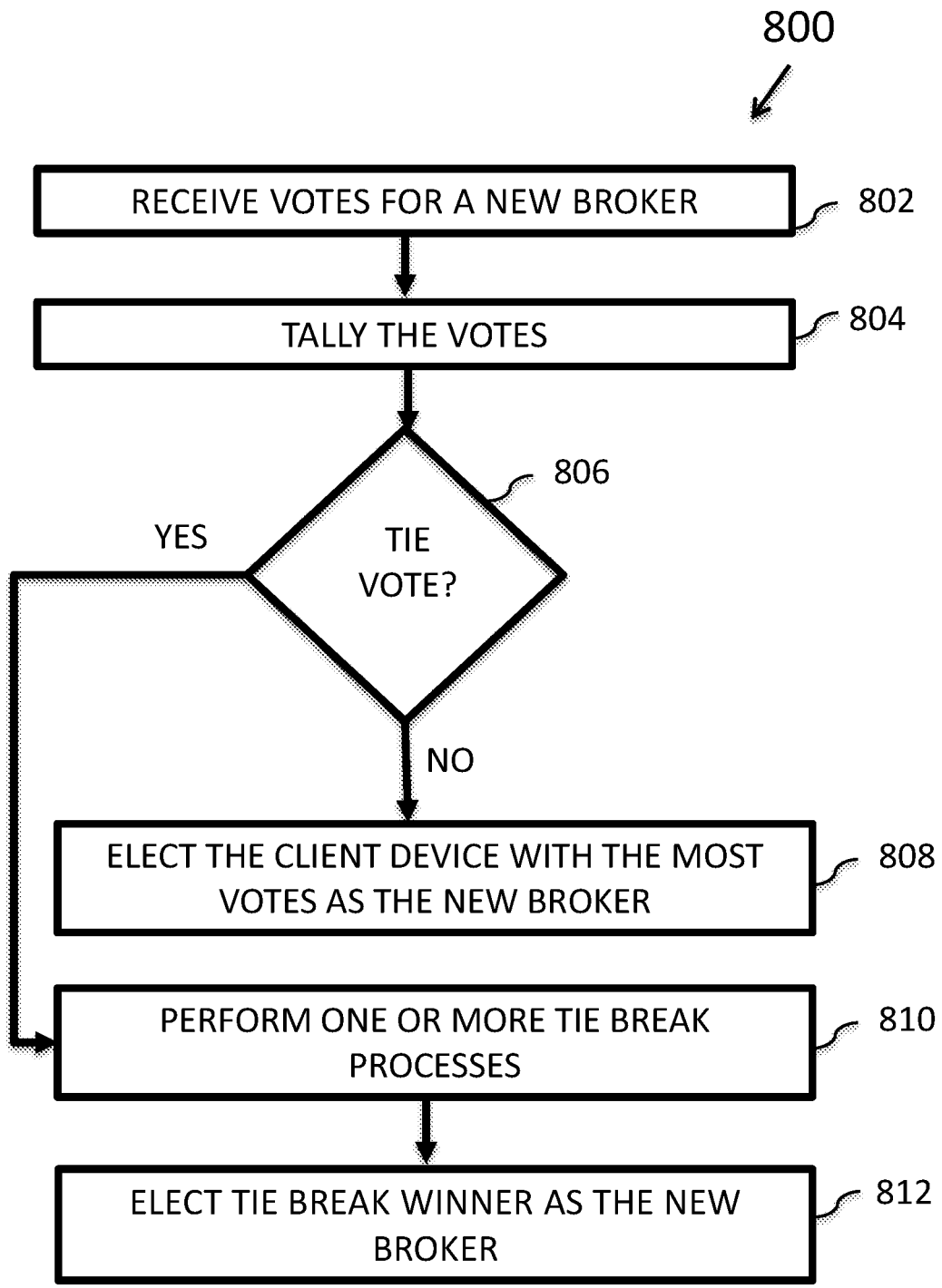

FIG. 8 is a schematic flow chart diagram illustrating another embodiment of a method 800 for electing a new broker for a channel on an MQTT bus 102. At least in the illustrated embodiment, the method 800 begins by a processor (e.g., processor 204) receiving the votes for electing a new broker (block 802) and tallies the votes (block 804).

The processor 204 may then determines whether there is a tie (block 806). In response to there not being a tie (e.g., a "NO" in block 806), the processor 204 elects the client device 104 with the most votes as the new broker (block 808). Here, the processor 204 should agree with all of the other client devices 104 on the winner of the broker election, as discussed elsewhere herein.

In response to there being a tie (e.g., a "YES" in block 806), the processor 204 performs one or more tie break processes (block 810), as discussed elsewhere herein. That is, the processor 204 may perform a first tie break process and, if there is still a tie, perform a second tie break process, as discussed in greater detail elsewhere herein.

The processor 204 then elects the client device 104 that won the one or more tie break processes as the new broker (block 812). Here, the processor 204 should agree with all of the other client devices 104 on the winner of the one or more tie break processes, as discussed elsewhere herein. While method 800 is discussed as being performed by one of the client devices 104 on the MQTT bus 102, various other embodiments of the method 800 include all of the client devices 104 on the MQTT bus 102 performing the method 800 to elect a new broker.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system, comprising:
 a Message Queuing Telemetry Transport (MQTT) bus; and
 a plurality of client devices in communication with each other on the MQTT bus,
  wherein each client device in the plurality of client devices is configured to:
   maintain a set of attributes for each other client device in the plurality of client devices on the MQTT bus, and
   cast a set of votes for a particular client device in the plurality of client devices on the MQTT bus to elect the particular client device as a new broker on the MQTT bus in response to a current broker on the MQTT bus becoming unavailable,
  wherein the set of votes cast for the particular client device are based on a first value corresponding to the set of attributes for the particular client device relative to a respective second value corresponding to the set of attributes for each of the other client devices in the plurality of client devices on the MQTT bus as calculated by each respective client device in the plurality of client devices on the MQTT bus.

2. The system of claim 1, wherein:
 each client device in the plurality of client devices on the MQTT bus is further configured to receive, on the MQTT bus, a set of heartbeat messages from each other client device in the plurality of client devices on the MQTT bus;

each respective heartbeat message comprises update data related to the set of attributes for a client device in the plurality of client devices associated with the respective heartbeat message; and the code further causes the processor to update the maintained set of attributes for the client device with the update data included in the received respective heartbeat message.

3. The system of claim 2, wherein:

the set of heartbeat messages from each other client device comprises a plurality of heartbeat messages; and the plurality of heartbeat messages from each other client device are one of:

received at consistent periodic intervals of time, received at random instances, or received in response to occurrence of a predetermined event.

4. The system of claim 1, wherein:

each client device in the plurality of client devices on the MQTT bus are further configured to calculate its quantity of votes for the set of votes based on its respective set of attributes.

5. The system of claim 4, wherein:

the set of attributes for the client device calculating its quantity of votes comprises a plurality of attributes;

each attribute in the set of attributes for the client device calculating its quantity of votes includes a weighted value;

each attribute in the set of attributes for the client device calculating its quantity of votes is assigned a respective quantity of votes corresponding to its weighted value; and one of:

each attribute in the set of attributes for the client device calculating its quantity of votes includes a same weighted value, each attribute in the set of attributes for the client device calculating its quantity of votes includes a different weighted value, or at least two attributes in the set of attributes for the client device calculating its quantity of votes include different weighted values.

6. The system of claim 4, wherein each attribute in the set of attributes for the client device calculating its quantity of votes corresponds to one of a type of computing device for the apparatus, a type of operating system (OS) on the apparatus, a version of the OS on the apparatus, an amount of time the apparatus has been available on the MQTT bus, a length of time the apparatus has been on the MQTT bus, a time when the apparatus was added to the MQTT bus, a computing capacity of the apparatus, a memory capacity of the apparatus, or an amount of power available to the apparatus.

7. The system of claim 1, wherein each attribute in the set of attributes for each client device corresponds to one of a type of computing device for the apparatus, a type of operating system (OS) on the apparatus, a version of the OS on the apparatus, an amount of time the apparatus has been available on the MQTT bus, a length of time the apparatus has been on the MQTT bus, a time when the apparatus was added to the MQTT bus, a computing capacity of the apparatus, a memory capacity of the apparatus, or an amount of power available to the apparatus.

8. The system of claim 1, wherein each client device is further configured to:

tally all of the votes; and passively confirm with all of the other client devices in the plurality of client devices on the MQTT bus which client device was elected as the new broker, wherein:

all of the client devices include a same attribute data for one another and will vote for a same client device to elect the same client device as the new broker based on having the same attribute data for one another, and each client device the plurality of client devices performs its own independent election without communicating with the other client devices.

9. The system of claim 8, wherein each client device is further configured to:

elect the particular client device as the new broker on the MQTT bus in response to the particular client device receiving a most votes;

perform one or more predetermined tie break processes to elect the new broker on the MQTT bus in response to two or more client devices in the plurality of client devices receiving a same quantity of votes.

10. The system of claim 9, wherein each client device is further configured to:

reconfigure itself as a broker client device in response to being elected as the new broker on the MQTT bus;

transmit messages to the other client devices in response to reconfiguring itself as the broker device; and reconfigure itself to recognize the elected client device as the broker on the MQTT bus in response to receiving the messages from the broker client device.

11. The system of claim 8, wherein:

each client device is further configured to at least one of:

resynchronize its maintained set of attributes for one or more other client devices in the plurality of client devices on the MQTT bus in response to casting its set of votes for a different client device that the other client devices in the plurality of client devices on the MQTT bus, and/or receive one or more messages from the new broker; and each client device is further configured to reconfigure itself to recognize the new broker as the broker on the MQTT bus in response to resynchronizing its maintained set of attributes for the one or more other client devices in the plurality of client devices on the MQTT bus and/or receiving the one or more messages from the new broker.

12. An apparatus, comprising:

a processor coupleable to a Message Queuing Telemetry Transport (MQTT) bus; and a memory configured to store code executable by the processor to:

maintain a set of attributes for each client device in a plurality of client devices on the MQTT bus, and cast a set of votes for a particular client device in the plurality of client devices on the MQTT bus to elect the particular client device as a new broker on the MQTT bus in response to a current broker on the MQTT bus becoming unavailable, wherein:

the set of votes cast for the particular client device are based on a first value corresponding to the set of attributes for the particular client device relative to a respective second value corresponding to the set of attributes for each of the other client devices in the plurality of client devices on the MQTT bus, and the apparatus is one of the plurality of client devices on the MQTT bus.

13. The apparatus of claim 12, wherein:

the code further causes the processor to receive, on the MQTT bus, a set of heartbeat messages from each other client device in the plurality of client devices on the MQTT bus;

each respective heartbeat message comprises update data related to the set of attributes for a client device in the plurality of client devices associated with the respective heartbeat message; and the code further causes the processor to update the maintained set of attributes for the client device with the update data included in the received respective heartbeat message.

14. The apparatus of claim 13, wherein:

the set of heartbeat messages from each other client device comprises a plurality of heartbeat messages; and the plurality of heartbeat messages from each other client device are one of:
received at consistent periodic intervals of time,
received at random instances, or
received in response to occurrence of a predetermined event.

15. The apparatus of claim 12, wherein:

the code further causes the processor to calculate a quantity of votes for the set of votes; and the quantity of votes for the set votes is based on the set of attributes for the apparatus.

16. The apparatus of claim 15, wherein:

the set of attributes comprises a plurality of attributes;

each attribute in the set of attributes for the apparatus includes a weighted value;

each attribute in the set of attributes for the apparatus is assigned a respective quantity of votes corresponding to its weighted value; and one of:
each attribute in the set of attributes for the apparatus includes a same weighted value,
each attribute in the set of attributes for the apparatus includes a different weighted value, or
at least two attributes in the set of attributes for the apparatus include different weighted values.

17. The apparatus of claim 15, wherein each attribute in the set of attributes for the apparatus corresponds to one of a type of computing device for the apparatus, a type of operating system (OS) on the apparatus, a version of the OS on the apparatus, an amount of time the apparatus has been available on the MQTT bus, a length of time the apparatus has been on the MQTT bus, a time when the apparatus was added to the MQTT bus, a computing capacity of the apparatus, a memory capacity of the apparatus, or an amount of power available to the apparatus.

18. The apparatus of claim 12, wherein each attribute in the set of attributes for each client device corresponds to one of a type of computing device for the apparatus, a type of operating system (OS) on the apparatus, a version of the OS on the apparatus, an amount of time the apparatus has been available on the MQTT bus, a length of time the apparatus has been on the MQTT bus, a time when the apparatus was added to the MQTT bus, a computing capacity of the apparatus, a memory capacity of the apparatus, or an amount of power available to the apparatus.

19. A method, comprising:

maintaining, by a processor, a set of attributes for each client device in a plurality of client devices on a Message Queuing Telemetry Transport (MQTT) bus; and casting a set of votes for a particular client device in the plurality of client devices on the MQTT bus to elect the particular client device as a new broker on the MQTT bus in response to a current broker on the MQTT bus becoming unavailable, wherein:
the set of votes cast for the particular client device are based on a first value corresponding to the set of attributes for the particular client device relative to a respective second value corresponding to the set of attributes for each of the other client devices in the plurality of client devices on the MQTT bus, and the processor is included on one of the plurality of client devices on the MQTT bus.

20. The method of claim 19, further comprising:

calculating a quantity of votes for the set of votes based on weighting each attribute in the set of attributes for the client device including the processor;

receiving, on the MQTT bus, a set of heartbeat messages from each other client device in the plurality of client devices on the MQTT bus, wherein each respective heartbeat message comprises update data related to the set of attributes for a client device in the plurality of client devices associated with the respective heartbeat message; and updating the maintained set of attributes for the client device with the update data included in the received respective heartbeat message, wherein each attribute in the set of attributes for each client device corresponds to one of a type of computing device, a type of operating system (OS), a version of the OS, an amount of time on the MQTT bus, a length of time on the MQTT bus, a time when added to the MQTT bus, a computing capacity, a memory capacity, or an amount of available power.

* * * * *